United States Patent
Chen et al.

(10) Patent No.: US 6,765,170 B2
(45) Date of Patent: Jul. 20, 2004

(54) METHOD FOR SINGLE SIDED SPOT WELDING

(75) Inventors: Chih-Chang Chen, Rochester Hills, MI (US); Chi-Mou Ni, Washington, MI (US); Michael Gerard Poss, Rochester Hills, MI (US); Alexander Michael Turley, Troy, MI (US); Daniel C. Hutchinson, Goodrich, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/322,131

(22) Filed: Dec. 17, 2002

(65) Prior Publication Data

US 2004/0112872 A1 Jun. 17, 2004

(51) Int. Cl.$^7$ ............................................... B23K 11/14
(52) U.S. Cl. ........................................ 219/59.1; 219/93
(58) Field of Search ............................ 219/59.1, 86.9, 219/117.1, 93

(56) References Cited

U.S. PATENT DOCUMENTS

| | | | |
|---|---|---|---|
| 3,541,296 A | * 11/1970 | Rudd | 219/117.1 |
| 4,136,272 A | * 1/1979 | Rudd | 219/107 |
| 4,233,484 A | * 11/1980 | Udall | 219/67 |
| 4,362,921 A | * 12/1982 | Rudd | 219/61.2 |
| 5,115,113 A | * 5/1992 | Miller | 219/89 |
| 5,708,248 A | 1/1998 | Poss et al. | 219/86.25 |
| 6,373,021 B1 | 4/2002 | Wang et al. | 219/93 |

\* cited by examiner

Primary Examiner—Clifford C. Shaw
(74) Attorney, Agent, or Firm—Laura C. Hargitt

(57) ABSTRACT

A method of single sided spot welding includes the steps of providing a metal tube having a convex surface portion and providing a metal sheet for welding to the metal tube. The method also includes the steps of contacting the metal sheet with the convex surface portion of the metal tube and contacting the metal sheet with a welding electrode. The method further includes the steps of supplying power to the welding electrode for melting metal and solidifying the molten metal to form a weld nugget between the metal sheet and the metal tube.

8 Claims, 2 Drawing Sheets

METHOD FOR SINGLE SIDED SPOT WELDING

TECHNICAL FIELD

The present invention relates generally to spot welding and, more particularly, to a method for single sided spot welding of hydroformed metal tubing with a metal sheet for assembling automotive structures.

BACKGROUND OF THE INVENTION

Hydroformed tubular components are becoming increasingly popular in recent automotive body structural applications. During vehicle body manufacturing, such hydroformed tubular components are integrated with sheet panels, and, most economically, welding is selected for the integrating process. However, such sheet to tube welding is often limited to one-side accessibility and represents certain challenges to the welding operations. Conventional joining methods such as TIG, MIG, and Laser welding processes, which are characteristic of their one-side operation, are ideal for one-side welding. However, all these processes have at least one of several drawbacks, such as cycle time, cost, and porosity caused by zinc vapor from zinc-coated sheet. On the other hand, the robust, efficient, low-cost, and most commonly used resistance spot welding process often requires two side accessibility.

In recent years, innovative modifications were made such that spot welding can be performed from only one side. An example of such spot welding is disclosed in U.S. Pat. No. 5,708,248 to Poss et al. and U.S. Pat. No. 6,373,021 to Wang et al. However, the single side spot welding process is currently limited to non-galvanized (bare) sheet applications. Because galvanized steel cannot be welded using the single sided spot welding process, a more costly MIG welding process is used.

In single sided spot welding, because the welding electrode is applied only on one side, the other (back) side of the weld is not supported. Therefore, excessive indentation of the sheet occurs due to applied welding force and softening of sheet/tube material caused by welding heat. Such excessive indentation often leads to a "hollow" or "doughnut" shape spot weld. In addition, because of the excessive indentation, tensile stresses develop in regions around the weld. At elevated temperatures during welding, melting of materials with a low melting point such as copper from the welding electrode and zinc from the galvanized coating occurs. The presence of foreign liquid phase at elevated temperatures can readily penetrate into the grain boundaries of steel substrate under tensile stresses leading to a phenomenon so-called liquid metal embrittlement (LME) cracking. Presence of such LME cracks is not acceptable, as it will compromise weld strength and integrity.

As a result, it is desirable to provide a new method of single sided spot welding for assembling automotive structures. It is also desirable to provide a method for single sided spot welding of hydroformed metal tubing with a metal sheet for assembling automotive structures. It is further desirable to provide a method of single sided spot welding of coated metal such as galvanized steel for assembling automotive structures. Therefore, there is a need in the art to provide a method for single sided spot welding that meets these desires.

SUMMARY OF THE INVENTION

It is, therefore, one object of the present invention to provide a new method for single sided spot welding.

It is another object of the present invention to provide a method for single sided spot welding of hydroformed metal tubing with a metal sheet for assembling automotive structures.

To achieve the foregoing objects, the present invention is a method for single sided spot welding. The method includes the steps of providing a metal tube having a convex surface portion and providing a metal sheet for welding to the metal tube. The method also includes the steps of contacting the metal sheet with the convex surface portion of the metal tube and contacting the metal sheet with a welding electrode. The method further includes the steps of supplying power to the welding electrode for melting metal and solidifying the molten metal to form a weld nugget between the metal sheet and the metal tube.

One advantage of the present invention is that a method of single sided spot welding is provided for assembling automotive structures. Another advantage of the present invention is that the method incorporates a convex tube surface in areas intended for spot welding derived from a cold-working, hydroforming process which are both structurally and metallurgically more resistant to collapsing and/or indentation from the applied weld force. Yet another advantage of the present invention is that the method provides quality spot welds of complete fusion (rather than a hollow shape) free of the LME cracks and meeting a required weld button size. Still another advantage of the present invention is that the method provides a lower limit on tube thickness. A further advantage of the present invention is that the method allows material selection to be broadened by not being limited to bare metal sheet. Yet a further advantage of the present invention is that the method allows convex surfaces readily produced during the hydroforming process to be welded to a metal sheet.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
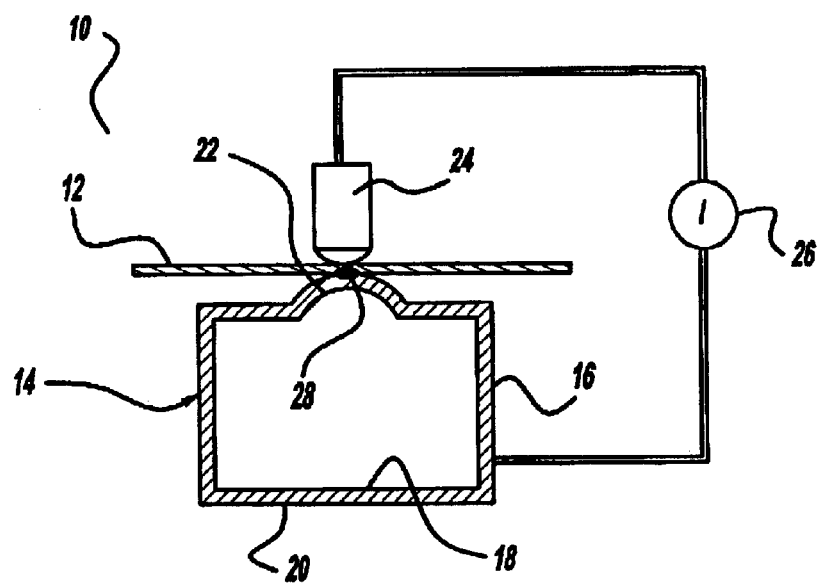
FIG. 1 is a fragmentary elevational diagrammatic view of a system for use with a method, according to the present invention, of single sided spot welding illustrated in operational relationship with a sheet and a tube.

Referring to the drawings and in particular FIG. 1, one embodiment of a system 10 for carrying out a method, according to the present invention, of single sided spot welding between a sheet or panel 12 and a tube, generally indicated at 14, is illustrated. By way of example, the sheet or panel 12 may be a roof panel and the tube 14 may be a roof rail of a vehicle (not shown). It should be appreciated that the system 10 welds the roof panel to the roof rail using single sided spot welding for assembling automotive structures.

The sheet 12 is generally planar and made of a metal material such as steel. The sheet 12 may be coated with a coating to form galvanized steel. The sheet 12 has a thickness in a range of approximately 0.7 millimeters (mm) to 3.0 mm. It should be appreciated that the sheet panel 12 is conventional and known in the art.

Figure 3:
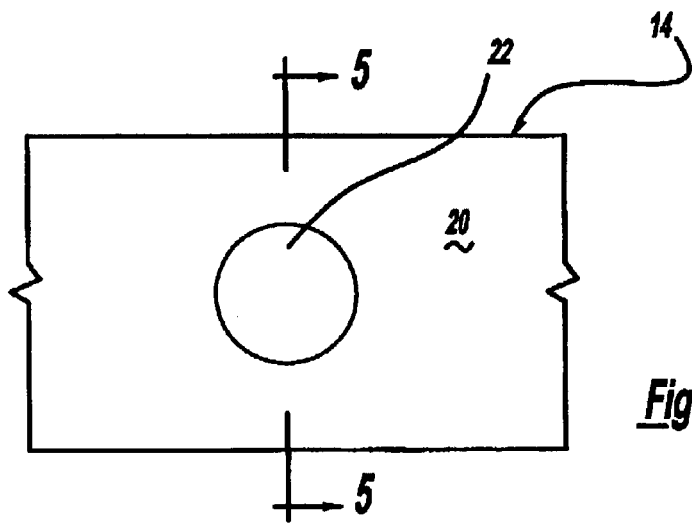
FIG. 3 is a plan view of the tube of FIG. 1.
Figure 5:
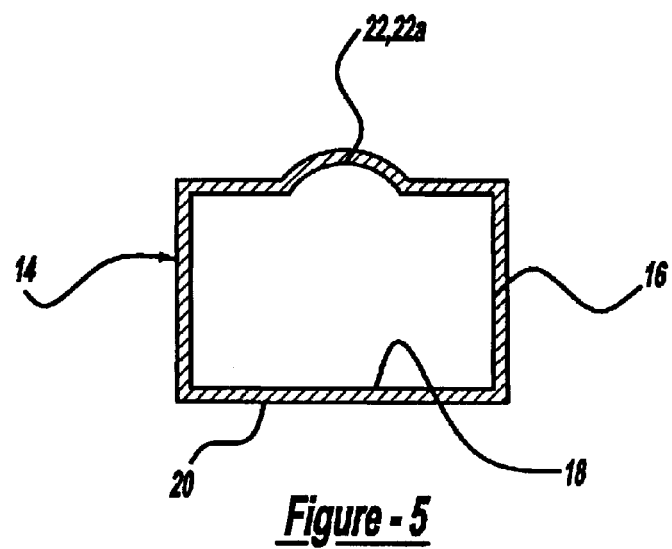
FIG. 5 is a sectional view taken along line 5—5 of FIGS. 3 and 4.

Referring to FIGS. 1, 3, and 5, the tube 14 is of a hydroformed type having a generally rectangular cross-sectional shape. The tube 14 has a generally continuous wall 16 having an inner surface 18 and an outer surface 20. The wall 16 has a thickness between the inner surface 18 and the outer surface 20 in a range of approximately 1.2 mm or greater. The tube 14 includes at least one convex surface portion 22 formed on at least one side by the wall 16 for welding to the sheet 12. The convex surface portion 22 is generally arcuate in shape and extends or protrudes outwardly. The tube 14 is made of a metal material such as steel. The tube 14 may be coated with a coating to form galvanized steel.

Figure 4:
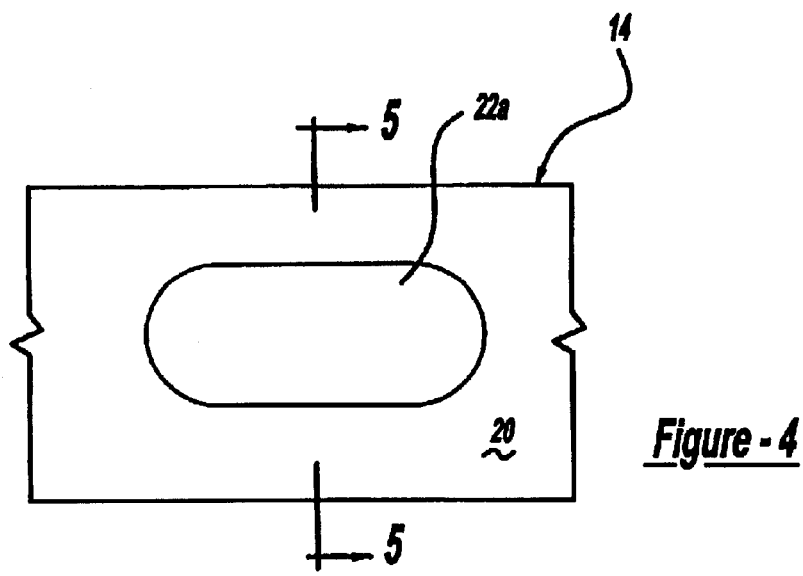
FIG. 4 is a plan view of another embodiment of the tube of FIG. 1.

As illustrated in FIGS. 4 and 5, in another embodiment where like parts have like reference numerals, the tube 14 includes at least one convex surface portion 22a formed on at least one side by the wall 16 for welding to the sheet 12. The convex surface portion 22a is generally elongated and arcuate in cross-sectional shape. It should be appreciated that the convex surface portion 22 has a generally "dome" shape as shown in FIG. 3 and the convex surface portion 22a has a generally "pillow" shape as shown in FIG. 4. It should also be appreciated that the convex surface portion 22 is localized and may be created on the outer surface 20 of the tube 14 at locations intended for welding during the hydroforming process of the tube 14.

The system 10 includes a welding electrode 24 and a welding power supply 26 electrically connected to the welding electrode 24 and the tube 14. The welding power supply 26 supplies power to the welding electrode 24 to form a weld nugget 28 between the sheet 12 and convex surface portion 22 of the tube 14. For example, approximately 14 kA of current is applied for about five cycles (1 cycle=1/60 second) to form the weld nugget 28. It should be appreciated that the weld nugget 28 has a weld button size greater than 4.0 mm. It should also be appreciated that the weld nugget 28 has minimal indentation and a complete fused nugget free of surface cracking.

Figure 6:
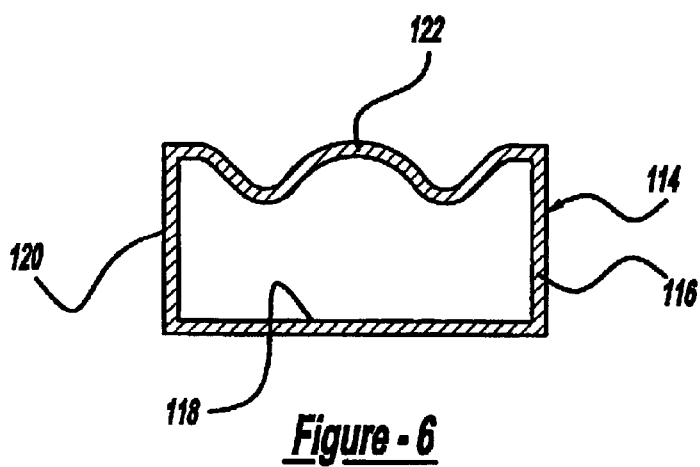
FIG. 6 is a sectional view of yet another embodiment, according to the present invention, of the tube of FIG. 1.

Referring to FIG. 6, yet another embodiment, according to the present invention, of the tube 14 is shown. Like parts have like reference numerals increased by one hundred (100). In this embodiment, the tube 114 is of a hydroformed type having a generally rectangular cross-sectional shape. The tube 114 has a generally continuous wall 116 having an inner surface 118 and an outer surface 120. The tube 114 includes at least one convex surface portion 122 formed on at least one side by the wall 116 for welding to the sheet 12. The convex surface portion 122 is generally arcuate in shape and is counter-sunk. The tube 114 is made of a metal material such as steel. The tube 114 may be coated with a coating to form galvanized steel. It should be appreciated that the counter-sunk convex surface portion 122 may be used in the event where the protruding convex surface portion 22,22a on the hydroformed tube 14 is undesired.

Figure 2:
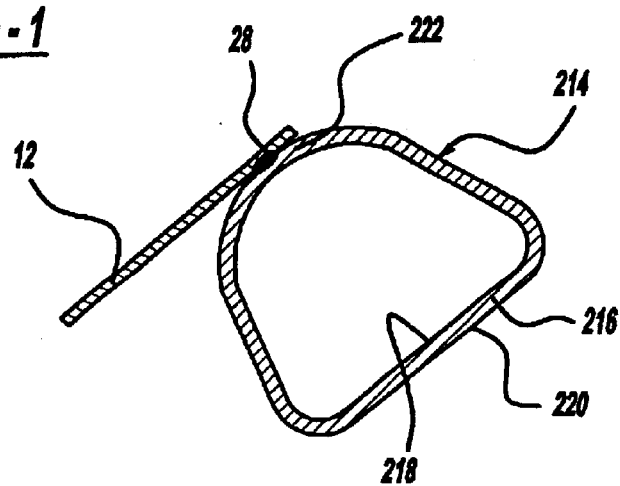
FIG. 2 is a fragmentary elevational diagrammatic view of another embodiment of the tube of FIG. 1 for use in the method of single sided spot welding.

Referring to FIG. 2, yet another embodiment of the tube 14 is shown. Like parts of the tube 14 have like reference numerals increased by two hundred (200). In this embodiment, the tube 214 is of a hydroformed type having a generally rectangular cross-sectional shape. The tube 214 has a generally continuous wall 216 having an inner surface 218 and an outer surface 220. The tube 214 includes at least one convex surface portion 222 formed on at least one side by the wall 216 for welding to the sheet 12. The convex surface portion 222 is generally arcuate in shape and has a relatively small cross-section. The tube 214 is made of a metal material such as steel. The tube 214 may be coated with a coating to form galvanized steel. It should be appreciated that the sheet 12 and tube 14,114,214 may be galvanized and the minimum thickness of the tube 14,114,214 can be reduced to 1.2 mm.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of single sided spot welding comprising the steps of:

providing a hydroformed metal tube having a convex surface portion;

providing a metal sheet having a thickness of about 0.7 millimeters to about three millimeters for welding to the hydroformed metal tube;

contacting the metal sheet with the convex surface portion of the hydroformed metal tube;

contacting the metal sheet with a welding electrode;

supplying power to the welding electrode for melting metal and solidifying the molten metal to form a weld nugget between the metal sheet and the hydroformed metal tube.

2. A method as set forth in claim 1 wherein said step of providing the metal sheet comprises providing the metal sheer as coated steel.

3. A method as set forth in claim 1 wherein said step of providing the hydroformed metal tube comprises providing the hydroformed metal tube having the convex surface portion protruding outwardly.

4. A method as set forth in claim 1 wherein said step of providing the hydroformed metal tube comprises providing the hydroformed metal tube having the convex surface portion being counter-sunk.

5. A method as set forth in claim 1 wherein said step of providing the hydroformed metal tube comprises providing the hydroformed metal tube having the convex surface portion with a dome shape.

6. A method as set forth in claim 1 wherein said step of providing the hydroformed metal tube comprises providing he hydroformed metal tube having the convex surface portion with a pillow shape.

7. A method as set forth in claim 1 wherein said step of providing the hydroformed metal tube comprises providing the hydroformed metal tube having a generally rectangular cross-section.

8. A method of single sided spot welding of automotive structures comprising the steps of:

providing a hydroformed metal tube having a generally rectangular cross-section and a convex surface portion;

providing a metal sheet being a coated steel having a thickness of about 0.7 millimeters to about three millimeters for welding to the hydroformed metal tube;

contacting the metal sheet with the convex surface portion of the hydroformed metal tube;

contacting the metal sheet with a welding electrode;

supplying power to the welding electrode for melting metal and solidifying the molten metal to form a weld nugget between the metal sheet and the hydroformed metal tube.

* * * * *